Figure 1:
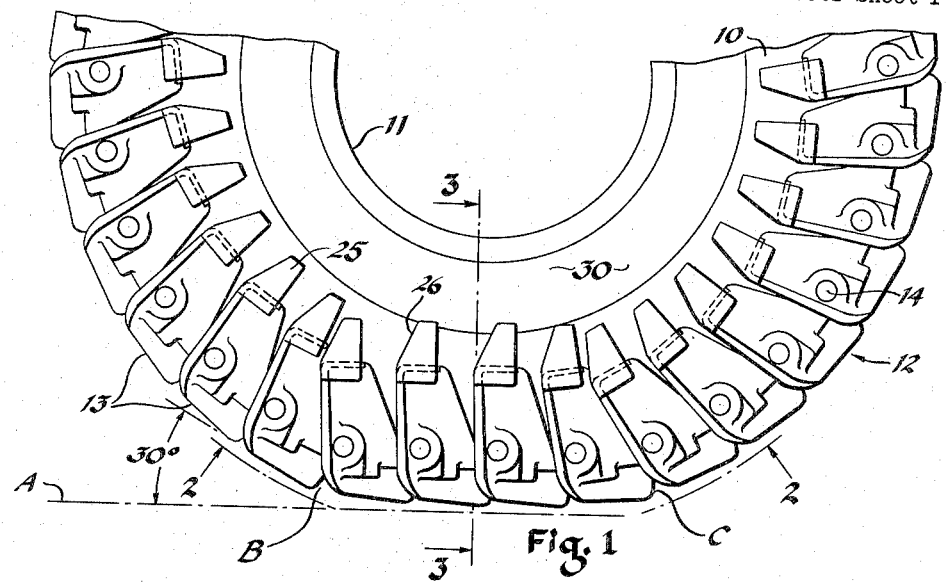

Sept. 25, 1956   R. Q. ARMINGTON   2,764,209
TIRE TRACK WITH SIDE THRUST LUGS
Filed Feb. 23, 1954   2 Sheets-Sheet 1

INVENTOR.
Raymond Q. Armington
BY
Hyde, Meyer, Baldwin & Doran
ATTORNEYS

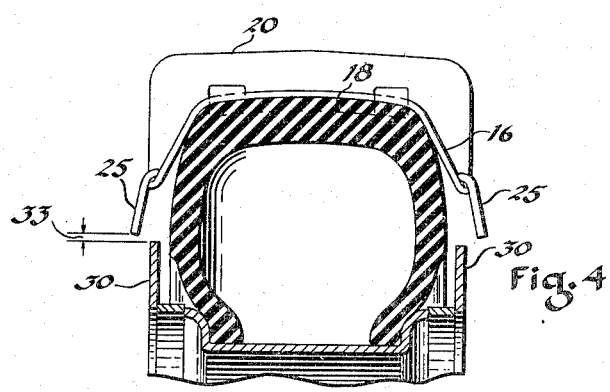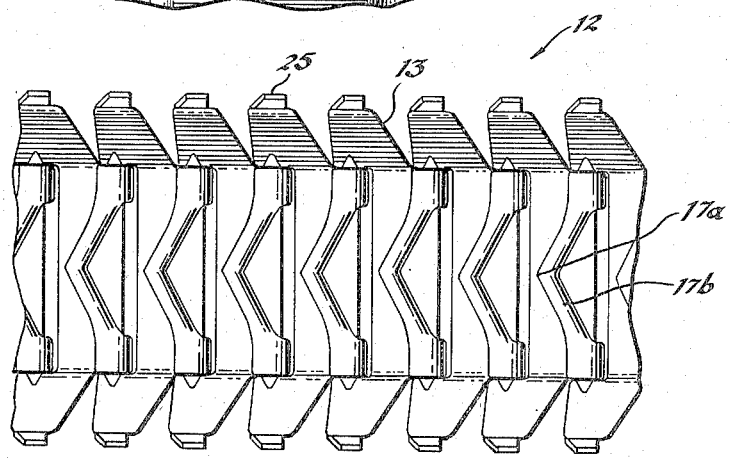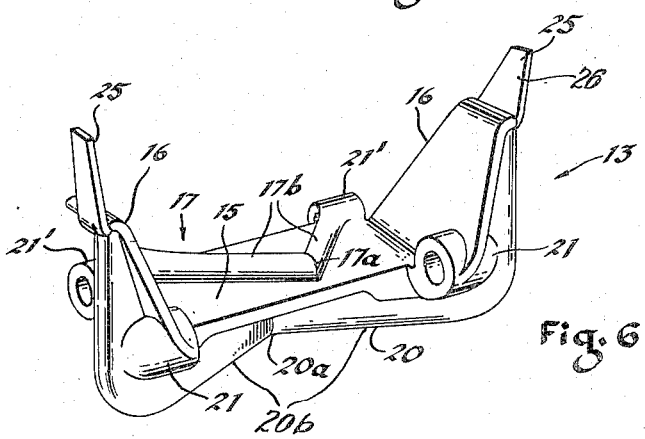

United States Patent Office 2,764,209
Patented Sept. 25, 1956

2,764,209

TIRE TRACK WITH SIDE THRUST LUGS

Raymond Q. Armington, Shaker Heights, Ohio, assignor to General Motors Corporation, Detroit, Mich., a corporation of Delaware Application February 23, 1954, Serial No. 411,886

1 Claim. (Cl. 152—182)

This invention relates to anti-slip attachments in the combination of a large resiliently tired wheel and an endless track surrounding said tire.

An object of this invention is to provide a track for a large pneumatic tire which will remain on the tire even though the tire be subjected to a very strong side thrust, which tends to dislodge the tire from its track.

Another object of the invention is to prevent a low pressure tire, operating in soft mud or other adverse ground conditions from slipping sidewise out of its track by providing a metal to metal contact between the track and wheel rim.

Another object of the invention is to provide a track shoe having extensions which cooperate with extensions on the wheel rim thereby to prevent lateral displacement of the tire from the tracks without interfering with the normal operation of the wheel.

Another object of the present invention is to provide a novel tire track with side thrust lugs characterized by its structural simplicity, the ease of assembly of its parts, its strong and sturdy nature and its low manufacturing cost. Other features of this invention reside in the arrangement and design of the parts for carrying out their appropriate functions.

Other objects and advantages of this invention will be apparent from the accompanying drawings and description and the essential features will be set forth in the appended claim.

Figure 2:
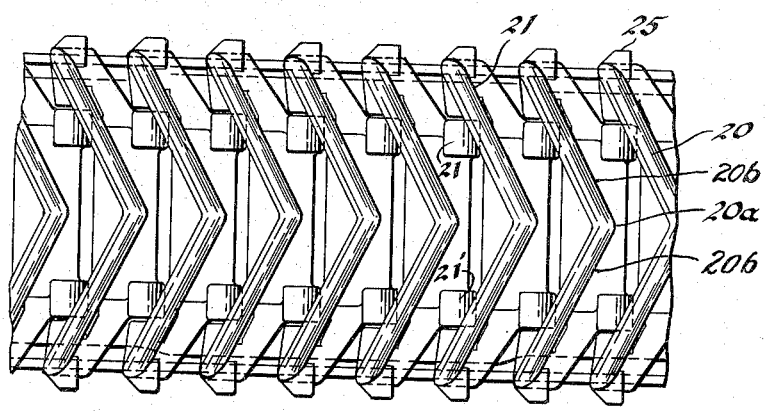
Figure 3:
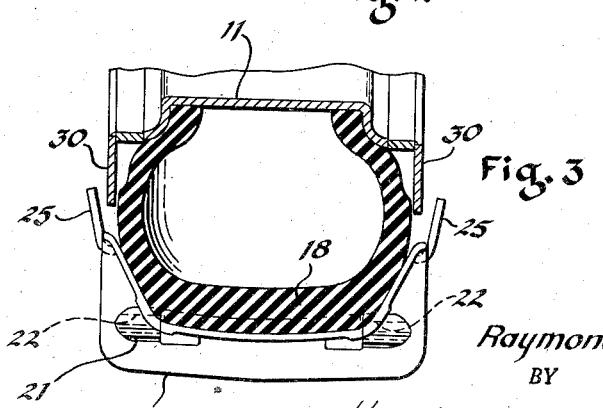

In the drawings:

Fig. 1 is a fragmental side elevational view showing a pneumatic tire with my improved endless track having side thrust lugs mounted on the tire with the entire combination under load, Fig. 2 is a bottom view of the loaded track taken on the line 2—2 of Fig. 1, Fig. 3 is a fragmental sectional view taken along the plane of line 3—3 of Fig. 1 showing the ground engaging portion of the tire and track under load, Fig. 4 is a fragmental sectional view similar to Fig. 3, but taken at a non-ground engaging portion of the tire and track and preferably diametrically opposite the section shown in Fig. 3, Fig. 5 is a plan view of the inner or tire engaging surface of a series of track shoes, Fig. 6 is a perspective view of one of the shoes or cleats forming the track of Fig. 1.

Off-the-road vehicles use large pneumatic tires for the purpose of carrying the load and for supporting the load over a substantially large area; particularly is this true when ground conditions are poor, such as found in sand or mud. It is necessary to provide the tires with an anti-slip attachment in order to gain sufficient tractive effect to propel the vehicle over soft ground and at the same time to give a protective effect to the pneumatic tire. For this purpose, the present invention applies an endless track substantially of the type disclosed in my copending application, Serial No. 404,852, filed January 19, 1954. It is important that an endless track of this type be firmly engaged with the tire at all times. In the past, it has been found that there is a strong tendency for the tire to slip sidewardly out of the track when the vehicle is being used on soft ground, which has an inclined surface. The slippage is due to a strong side thrust set up by the weight of the vehicle causing the tire to slip laterally out of its track. The present invention is directed to overcoming this difficulty by providing a locking means by which the track is retained upon the tire and its associated wheel under all operating conditions.

The tire illustrated herein is approximately 18" x 24", having an overall diameter of approximately five feet. My invention is intended for successful operation with tires of this size or larger, utilizing an internal pressure of not substantially over 25 pounds per square inch.

The tire 10 is of this character and is mounted upon wheel rim 11, in the usual manner. The endless track 12 comprises a plurality of identical circumferentially spaced shoes 13, adapted to straddle the tread portion of the tire. The shoes are fastened together by means of articulating or hinge connections 14. Each track shoe has a substantially flat tire engaging inner surface 15 as seen in Fig. 6. This inner surface 15 diverges laterally outwardly and radially inwardly at its end portions (with respect to the center of the tire, when the shoe is assembled upon the tire), forming the end or wing portions 16. The flat inner surface of the track contains a chevron or V-shaped rib 17, as seen in Fig. 6, composed of two legs 17b having their apex 17a along the center line of the shoe, while the legs 17b diverge away from this point to terminate in spaced relationship near one of the longer sides of the shoe. The V-shaped rib 17 is adapted to fit into one of the V-shaped grooves 18 which extend crosswise of the tire. Other non-slipping arrangements between the tire and track shoes might be used.

The ground engaging surface of the track shoe contains an integrally formed V-shaped grouser 20 having generally the same shape as rib 17. The grouser 20 has a pair of diverging legs 20b joined at apex 20a which is disposed in a direction opposite to that of apex 17a of the rib 17. The articulating connections 14 previously mentioned, are provided near the distal ends of the legs 20b in the form of bosses 21 and near the ends of legs 17b in the form of bosses 21', the bosses of adjacent shoes being joined together by hinge pins 22.

The novel anti-slip attachment, which is the subject of this invention, comprises in part projecting members in the form of lugs or flanges 25, which are rigidly fastened to or made integral with each end portion or wing 16 of each track shoe 13. The lug 25 is shown welded to the shoe; however, it can be secured to the wing 16 in any other suitable manner. It should be understood that the wing 16 could also be extended to form the lug 25, thereby having the lug 25 formed as an integral and continuous part of the shoe 13. The lugs or flanges 25 are spaced laterally apart a distance somewhat greater than the transverse width of the tire 10 and are thus adapted to straddle the side walls of said tire. The lugs 25 are directed generally radially inwardly toward the center of the tire with a slight divergence away from the adjacent face of the tire.

When the tire is loaded, it will be seen to flatten along a straight line or chord A, as seen in Fig. 1. This flattening will hereinafter be referred to as "normal tire flattening" and is the amount a normally inflated tire will flatten under a normal load. It is measured by the angle formed by the tangent of the tire tread with the chord A as seen in Fig. 1 and has been found to be approximately 30 degrees.

Normal tire flattening is a characteristic of the tire which must be taken into account when designing the track shoe lugs 25. They must be spaced and angulated so that under normal flattening, they will clear one another as they pass from the free round trajectory of Fig. 4, to the flattened chord portion A of the tire, as seen in Fig. 1. In order to accomplish this maneuver, the trailing edges 26 of the lugs 25 have been cut at an angle that will allow the shoes 13 to pivot at points B and C, as seen in Fig. 1, about their articulated connections 14 and yet not have the extended lugs 25 interfere with one another.

The wheel rim 11 has its marginal edges provided with continuous annular bands or flanges 30 which project axially outward from the rim for a short distance and then radially away from the center of the wheel. The flanges can be constructed as shown in Figs. 3 and 4 by fastening an annular structural member 30 to the rim 11 by any suitable means. As an alternate construction, the rim 11 could itself be extended to form an integral and continuous extension flange of this type.

Referring now to Fig. 4, the radially extending portions of the flange 30 are seen to be spaced apart a distance greater than the transverse width of the tire and less than the transverse distance between the opposite side lugs 25 of a track shoe 13. It should be noted from Fig. 4 that under normal tire inflation, the free end portion of the rim flanges 30 and the shoe lugs 25 approach one another, but do not overlap on the upper or free round part of the tire. A radially extending space 33 is maintained between the flanges 30 and the shoe lugs 25 circumferentially around most of the tire. Only on the ground engaging portion of the tire along chord A of Fig. 1, are the shoe lugs, by reason of the weight of the vehicle thereon, caused to overlap the rim flange members. Thus, normal tire flattening causes the rim flanges and shoe lugs to approach one another to the point where they will just slightly overlap. The space between the free ends of the rim flanges and shoe lugs should always be less than the amount of tire flattening under normal pressure, to insure an overlapping condition. The space 33 further serves the important function of providing an escape for dirt and mud which may collect between the tire and track 12.

The operation of my novel anti-slip attachment should now be apparent. Track shoes 13 and their lugs 25 envelop the greater part of the outer peripheral tractive surface of the tire and extend radially inward over a substantial portion of the tire sidewalls. The lugs 25 are carefully disposed so as to lie adjacent to the tire sidewalls and yet be spaced therefrom a distance great enough to accommodate the annular flanges 30 extending radially outward from the wheel rim 11. The annular flanges 30 of the wheel rim 11 are positioned transversely within the confines of the lugs 25 and are spaced as closely as possible to the sidewall of the tire without permitting the flange to rub destructively against the tire. An overlapping of at least two separate shoe lugs 25 with the annular flange 30, on each side of the tire, takes place at all times under normal tire flattening, as seen in Fig. 1. Any side thrust tending to remove the tire 10 from the track in a sidewardly direction will be resisted by the overlapping lugs and flanges. The tire is confined to the track regardless of the direction of the thrust since the cooperating lugs and flanges will abut one another should the tire move in a lateral direction.

In view of the foregoing description, taken in conjunction wtih the accompanying drawings, it is believed that a clear understanding of the construction, operation and advantages of the device will be quite apparent to those skilled in this art.

It is to be understood, however, that even though there is herein shown and described a preferred embodiment of the invention, the same is susceptible to certain changes fully comprehended by the spirit of the invention.

What I claim is:

In combination, a wheel rim, a pneumatic tire mounted on said rim, an endless track completely surrounding and engaging the circumference of said tire, said track being normally free of said wheel rim, said track comprising a plurality of shoes and articulating connections between adjacent shoes, circumferentially extending flanges on the side edges of said wheel rim projecting radially outwardly away from said rim, said flanges being spaced apart a distance greater than the transverse width of the tire, flanges on the side edges of said track shoes projecting radially inwardly toward said rim, said flanges on said track shoes spaced apart a distance greater than the transverse distance between the flanges of said wheel rim, said flanges on said wheel rim and track shoes being normally free of contact with one another, said track shoe flanges and said flanges on said wheel rim being spaced radially apart circumferentially about all of said tire except at the point of tire flattening, said track shoe flanges being shaped and positioned to clear one another at the point of flattening of said tire under normal load flattening conditions, tire flattening causing said flanges on said track shoe and wheel rim to approach one another until a portion of their respective side surfaces lie adjacent and overlap one another, thereby preventing any possible lateral displacement of the track from said tire.

References Cited in the file of this patent

UNITED STATES PATENTS

| | | |
|---|---|---|
| 888,269 | Stevens | May 19, 1908 |
| 2,046,299 | Armington | June 30, 1936 |
| 2,294,772 | Cook | Sept. 1, 1942 |

FOREIGN PATENTS

| | | |
|---|---|---|
| 332,032 | France | May 13, 1903 |